April 25, 1944.  M. S. MERRILL  2,347,275
DRIVE MECHANISM
Filed March 28, 1942    2 Sheets-Sheet 1

INVENTOR.
Marcellus S. Merrill,
BY
Wilkinson, Huxley, Byron & Knight
Attys.

April 25, 1944.　　M. S. MERRILL　　2,347,275
DRIVE MECHANISM
Filed March 28, 1942　　2 Sheets-Sheet 2
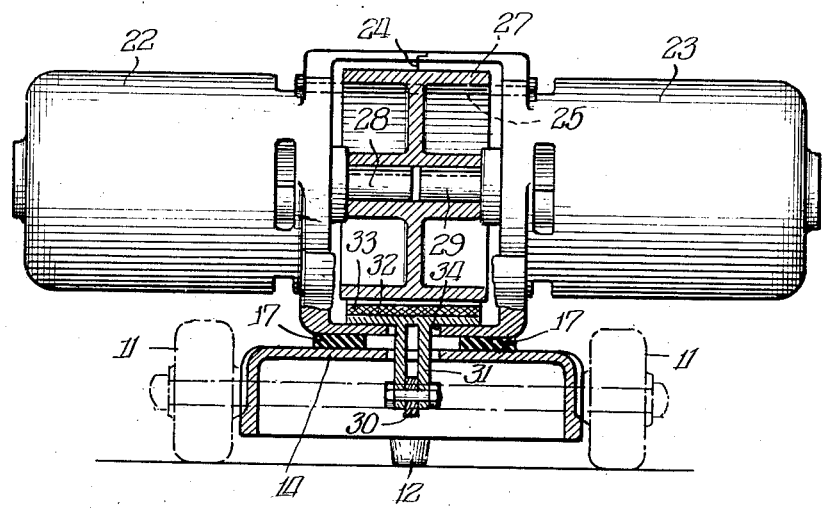
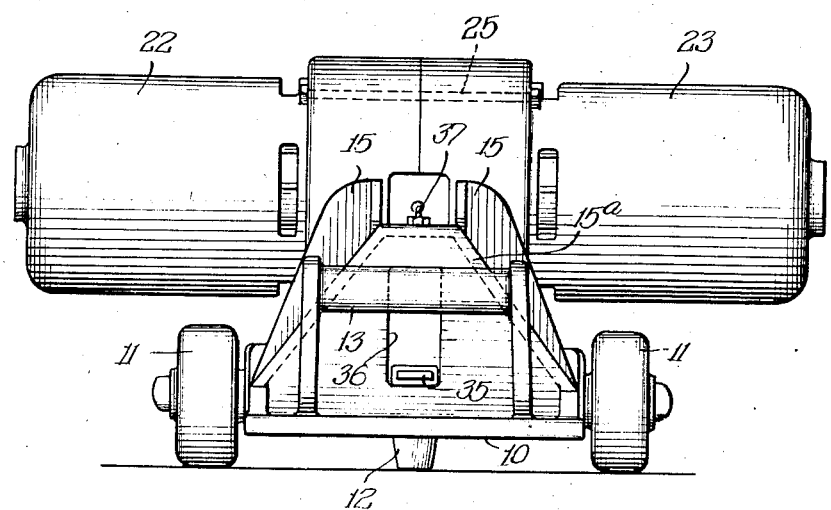
INVENTOR.
Marcellus S. Merrill,
BY Wilkinson, Huxley, Byron & Knight
Attys Patented Apr. 25, 1944

2,347,275

UNITED STATES PATENT OFFICE 2,347,275

DRIVE MECHANISM

Marcellus S. Merrill, Denver, Colo.

Application March 28, 1942, Serial No. 436,575

6 Claims. (Cl. 74—13)

The present invention relates to improvements in drive units.

The present invention is applicable commercially to drive units such as are used for driving a wheel of a motor car or truck during the operation of balancing such wheel. Such a unit should have a high power rating and high initial torque. This will be understood when it is considered that in balancing a wheel such as used on a five-ton truck motive power in the neighborhood of four horse power will be required to bring such a wheel quickly up to a peripheral speed of seventy-five miles an hour. The drive unit must be convenient for the operator to handle, must have light weight, and must be compact and easy to apply. In order to be practical the drive unit must be able to bring the wheel up to speed in a minimum of time, and it must be provided with braking mechanism for bringing the wheel to a quick stop for placement of weights, or other operations to be performed upon the wheel.

An object of the present invention is to provide a drive unit for a wheel or the like which is compact, light in weight and practical in operation.

A further object is to provide a drive unit having a driving wheel provided with motors at each of its extremities, whereby good balance and certainty of operation may be had.

A further object is to provide a drive unit combining high power, compactness, ease of handling, and good braking characteristics.

A further object is to provide a drive unit well adapted to meet the needs of commercial operation.

Further objects will appear as the description proceeds.

Referring to the drawings—

Figure 3 is a view partly in section, the section being taken along the plane indicated by the arrows 3—3 of Figure 2; and Figure 4 is a view in rear elevation of the structure shown in Figure 1.

Figure 1:
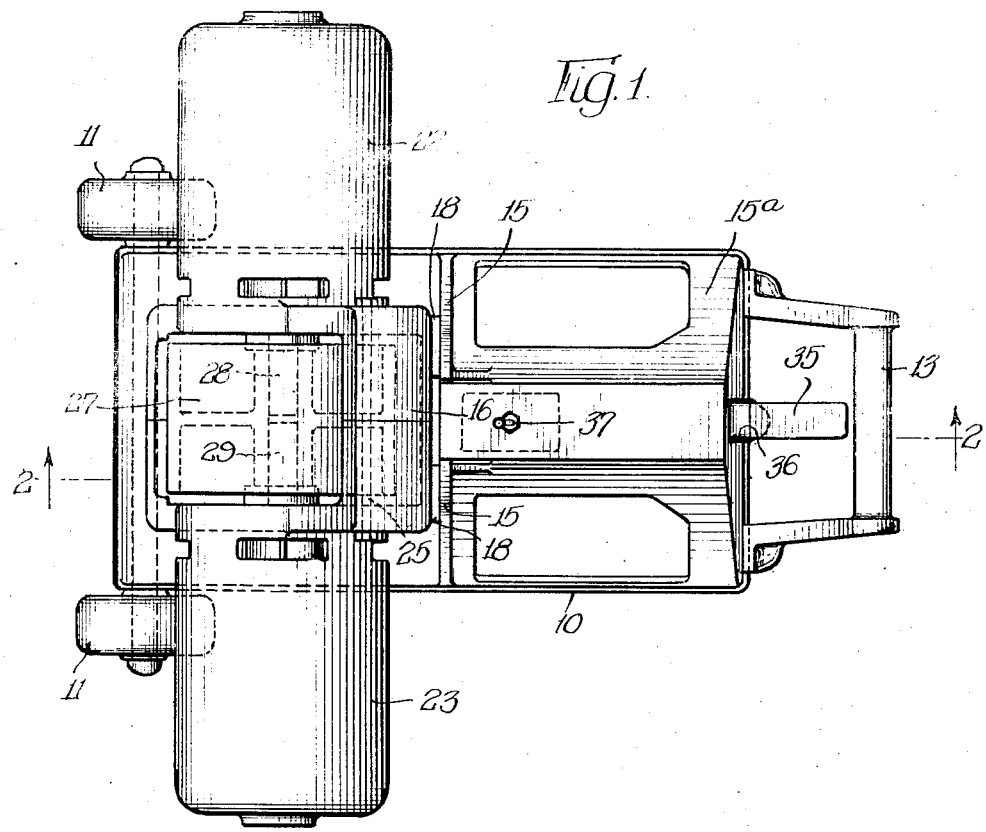
Figure 1 is a top plan view of a drive unit embodying the principles of the present invention.

The numeral 10 indicates a carriage provided with the rollers 11—11 adjacent to its forward extremity. Adjacent to its rear extremity said carriage 10 is provided with the foot 12. The rollers 11—11 and the foot 12 form a three-point base. The carriage 10 at its rear is provided with the handle 13, whereby the drive unit may be conveniently trundled about.

The forward portion of the carriage 10 is provided with the wall 14, which is substantially horizontal when the drive unit is in operating position. Said drive unit is also provided with the vertical wall 15, which is backed up by the box-like structure 15a.

The numeral 16 indicates a housing adapted to rest upon a pair of cushioning pads 17—17 carried by the wall 14 of the carriage. Said housing 16 is also adapted to rest against a pair of cushioning pads 18—18 carried by the vertical wall 15.

Figure 2:
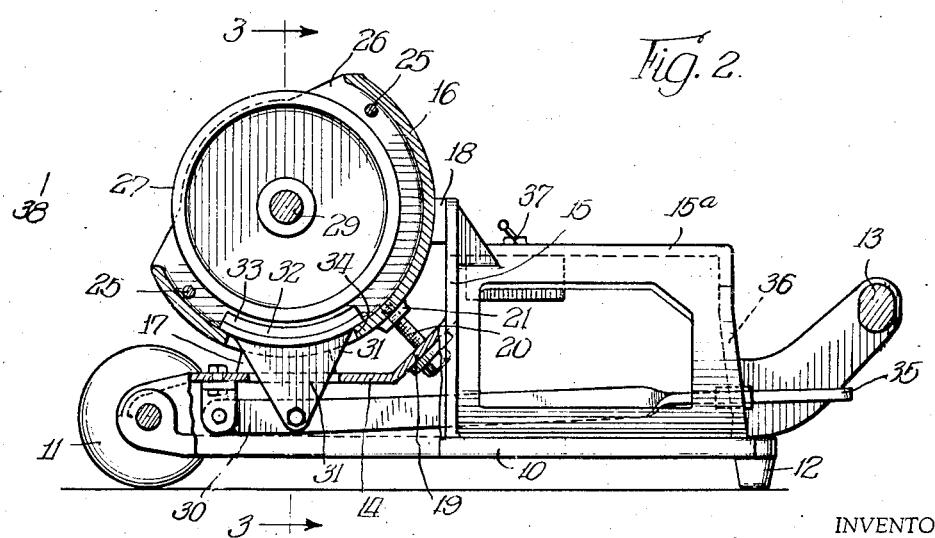
Figure 2 is a side view, partly in section, of the structure shown in Figure 1, the section being taken along the plane indicated by the arrows 2—2 of Figure 1.

As illustrated more particularly in Figure 2, the horizontal wall 14 and the vertical wall 15 are joined by means of the inclined wall 19. Extending through the inclined wall 19 is the bolt 20 having its head positioned to exert pressure on the under side of the inclined wall 19 and having its upper extremity threaded into a boss 21 formed in the housing 16. By means of the bolt 21 the housing 16 is held in firm engagement with the resilient pads 17—17, 18—18.

The housing 16 is split intermediate of its length into the housing halves 22 and 23, which may be identical except that if preferred one of said halves may dovetail into the other at the center line 24, thereby providing a very rigid construction. Said housing halves 22 and 23 may be held together by means of the bolts 25—25. The housing 16 intermediate of its length is provided with the opening 26 whereby to expose the periphery of the driving wheel 27. Said driving wheel 27 is mounted upon the adjacent extremities of the aligned shafts 28 and 29, which shafts form parts of electric motors (not illustrated in detail) housed within the housing halves 22 and 23 respectively. Said electric motors will preferably be series motors, which have decided advantages for this class of work, being powerful for their weight and size and having high initial torque characteristics.

Hinged to the forward portion of the carriage 10 is the brake lever 30, which has pivotally mounted thereon the swinging member or operating means 31. Said swinging member 31 has an arcuate portion 32 carrying a brake lining 33 adapted to engage the periphery of the driving wheel 27. The housing 16 is provided with the aperture 34 for permitting movement of the swinging member 31. The arcuate portion 32 of the swinging member 31 has sufficient length circumferentially of the casing 16 to rest upon the portions thereof adjacent to the aperture 34, whereby said swinging member 31 is supported in position when the lever 30 is in its lowermost position. The swinging extremity of the brake lever 30 is provided with the handle 35, whereby the brake lever 30 may be conveniently operated.

The box-like structure 15a will be provided at its rear extremity with an aperture 36 for guiding the brake lever 30 in its up and down movement. A switch 37 may be located upon the box-like housing 15a for controlling the operation of the motors for driving the driving wheel 27.

In operation the drive unit illustrated may be trundled about upon the rollers 11—11, the handle 13 providing a convenient means for handling the device. After the portion of the car, truck, or the like, has been jacked up to release from the floor the wheel to be balanced, the drive unit will be moved up into a position wherein the drive wheel 27 contacts with the wheel to be balanced, which wheel has been indicated in Figure 2 by the numeral 38. Operation of the switch 37 will cause rotation of the drive wheel 27. Inasmuch as the driving motors for said driving wheel will preferably be high-speed series motors which have high initial torque characteristics, the wheel 38 will be quickly brought up to speed.

After the necessary observation has been made, the driving wheel 27 and the wheel 38 may be quickly brought to a standstill by operation of the switch 37 and operation of the brake lever 30. A simple lifting of the brake lever 30 by means of the handle 35 will cause a quick, smooth application of the brake lining 33 to the driving wheel 27, bringing the parts to a quick stop. The necessary placement of weights may then be made upon the wheel to be balanced, and the wheel may be again brought up to full speed quickly and with certainty, whereby the balancing of the wheel may be accomplished in a minimum of time and with a minimum of effort. The provision of the two motors coaxially disposed at the two ends of the driving wheel 27 affords maximum power for a given weight and size of apparatus.

The drive unit embodying the principles of the present invention provides a perfectly balanced instrument which is compact and convenient for the operator to handle. By reason of its perfect balance it utilizes the desirable high starting torque characteristics of the series type motors which are preferably employed.

Though a preferred embodiment of the present invention has been described in detail, many modifications will occur to those skilled in the art. It is intended to cover all such modifications that fall within the scope of the appended claims.

What is claimed is:

1. A multimotor drive mechanism comprising a carrying member, a driving wheel adapted to be brought into driving relationship with a wheel of a motor vehicle, a pair of driving motors connected to said driving wheel coaxially disposed relative thereto and at the two extremities of said driving wheel, means for mounting said driving wheel and said motors as a unit upon said carrying member, a brake, and lever means for applying said brake, said lever means having a manually operable portion adjacent to the rearward extremity of said carrying member.

2. A multimotor drive mechanism comprising a carrying member and a drive unit carried by said carrying member, said drive unit comprising a drive wheel adapted to be disposed in engagement with a motor car wheel and a pair of motors for propelling said drive wheel, said motors being mounted coaxially with said drive wheel at the two extremities of said drive wheel, said carrying member having carrying portions angularly disposed relative to each other, cushioning member mounted upon said carrying portions, and adjustable means disposed between said carrying portions for holding said unit against said cushioning means.

3. A multimotor drive mechanism comprising a carrying member, a driving wheel, a pair of driving motors connected to said driving wheel coaxially disposed relative thereto and at the two extremities of said driving wheel, means for mounting said driving wheel and said motors as a unit upon said carrying member, said mounting means including an apertured casing, a swinging member located within the aperture in said casing, said swinging member carrying a brake lining adapted to engage the periphery of said driving wheel, and lever means connected to said swinging member for controlling the engagement of said brake lining with said driving wheel, said lever means having a manually operable portion adjacent to the rearward extremity of said carrying member.

4. A multimotor drive mechanism comprising a carrying member, a driving wheel, a pair of driving motors connected to said driving wheel coaxially disposed relative thereto and at the two extremities of said driving wheel, means for mounting said driving wheel and said motors as a unit upon said carrying member, said mounting means including an apertured casing, a swinging member located within the aperture in said casing, said swinging member carrying a brake lining adapted to engage the periphery of said driving wheel, and lever means connected to said swinging member for controlling the engagement of said brake lining with said driving wheel, said lever means having a manually operable portion adjacent to the rearward extremity of said carrying member, said swinging member having an arcuate portion adapted to rest upon said casing to be supported by said casing when said lever is in its lowermost position.

5. A multi-motor drive mechanism comprising a carrying member, a driving unit mounted transversely of said carrying member, said driving unit including a housing divided into a pair of housing members dove-tailed together and securely held together, a driving wheel adapted to be brought into driving relationship with a wheel of a motor vehicle, and a pair of driving motors connected to said driving wheel coaxially disposed relative thereto and at the two extremities of said driving wheel, said motors being disposed within said housing members, said driving unit being apertured whereby to expose said driving wheel to the exterior thereof.

6. A multi-motor drive mechanism comprising a carrying member, a driving unit mounted transversely of said carrying member, said driving unit including a housing divided into a pair of housing members dove-tailed together and securely held together, a driving wheel adapted to be brought into driving relationship with a wheel of a motor vehicle, a pair of driving motors connected to said driving wheel coaxially disposed relative thereto and at the two extremities of said driving wheel, said motors being disposed within said housing members, said driving unit being apertured whereby to expose said driving wheel to the exterior thereof, a brake for said driving wheel, operating means for said brake, said housing being apertured for the reception of said operating means, and lever means for controlling said operating means.

MARCELLUS S. MERRILL.